US010055700B2

(12) United States Patent
Schueller et al.

(10) Patent No.: US 10,055,700 B2
(45) Date of Patent: Aug. 21, 2018

(54) INTELLIGENT TOOL FOR COLLECTING AND MANAGING DATA DURING MANUAL HARVESTING OF FRUITS AND VEGETABLES

(71) Applicant: Trimble Inc., Sunnyvale, CA (US)

(72) Inventors: John Kenneth Schueller, Gainesville, FL (US); Arthur Francis Lange, Sunnyvale, CA (US); Uriel Aparecido Rosa, Woodland, CA (US)

(73) Assignee: Trimble Inc., Sunnyvale, CA (US)

( * ) Notice: Subject to any disclaimer, the term of this patent is extended or adjusted under 35 U.S.C. 154(b) by 1136 days.

(21) Appl. No.: 14/229,914

(22) Filed: Mar. 30, 2014

(65) Prior Publication Data

US 2015/0278719 A1 Oct. 1, 2015

(51) Int. Cl.
G06Q 10/06 (2012.01)
G06Q 50/02 (2012.01)

(52) U.S. Cl.
CPC .......... *G06Q 10/063* (2013.01); *G06Q 50/02* (2013.01); *G05D 2201/0201* (2013.01)

(58) Field of Classification Search
USPC .............. 705/7.11; 701/50; 56/10.2 A; 707/1
See application file for complete search history.

(56) References Cited

U.S. PATENT DOCUMENTS

| 4,392,304 A | 7/1983 | Plesa |
| 4,905,768 A | 3/1990 | Lorenz |
| 5,338,078 A | 8/1994 | Basek |
| 6,349,776 B1 | 2/2002 | Hus |
| 6,467,551 B1 | 10/2002 | Washek |
| 6,536,535 B1 | 3/2003 | Washek |
| 7,622,641 B2 | 11/2009 | McCutchen et al. |
| 7,803,992 B2 | 9/2010 | McCutchen et al. |
| 7,897,846 B2 | 3/2011 | Chicoine et al. |
| 7,928,296 B2 | 4/2011 | Chicoine et al. |
| 7,968,770 B2 | 6/2011 | Guida, Jr. et al. |

(Continued)

OTHER PUBLICATIONS

Fukatsu et al., Monitoring System for Farming Operations with Wearable Devices Utilized Sensor Networks, Sensors 2009, 9, 6171-6184.*

(Continued)

*Primary Examiner* — Nadja N Chong Cruz
(74) *Attorney, Agent, or Firm* — Kilpatrick Townsend & Stockton LLP

(57) ABSTRACT

An apparatus for collecting and managing data during an agricultural manual operation is provided. The agricultural manual operation includes harvesting, planting roots, cutting flowers, and pruning and thinning fruit trees or vegetables. The apparatus comprises: an intelligent tool configured to log an event including an agricultural manual operation when a picker succeeds in picking at least one harvested product by using the intelligent tool, or planting event when a worker succeeds in planting at least one product, or cutting flowers event when a worker succeeds in cutting at least one flower product, or pruning and thinning event when a worker succeeds in thinning fruit trees. The apparatus further comprises a means for collecting a set of data relevant to at least one manually picking event, or manually planting event, or manually cutting event, or manual pruning or thinning event.

20 Claims, 2 Drawing Sheets

(56) References Cited

U.S. PATENT DOCUMENTS

| | | | |
|---|---|---|---|
| 7,973,218 B2 | 7/2011 | McCutchen et al. | |
| 8,203,033 B2 | 6/2012 | McCutchen et al. | |
| 8,324,457 B2 | 12/2012 | Guida, Jr. et al. | |
| 8,575,431 B2 | 11/2013 | Charne et al. | |
| 8,581,046 B2 | 11/2013 | Charne et al. | |
| 8,609,935 B2 | 12/2013 | Kinney et al. | |
| 2003/0182260 A1* | 9/2003 | Pickett | A01B 79/005 |
| 2006/0213167 A1* | 9/2006 | Koselka | A01D 46/30 |
| | | | 56/10.2 A |
| 2007/0174152 A1* | 7/2007 | Bjornberg | G01C 15/00 |
| | | | 705/28 |
| 2014/0236381 A1* | 8/2014 | Anderson | A01D 75/00 |
| | | | 701/1 |
| 2015/0199637 A1* | 7/2015 | Pfeiffer | G06Q 10/06393 |
| | | | 705/7.39 |

OTHER PUBLICATIONS

Maja et al., Development of a yield monitoring system for citrus mechanical harvesting machines, Precision Agric, 2010, Springer Science+Business Media, 11:475-487. (Year: 2010).*

Schueller et al., Low-cost automatic yield mapping in hand-harvested citrus, Computers and Electronics in Agriculture 23 (1999) Elsevier, 145-053 (Year: 1999).*

* cited by examiner

INTELLIGENT TOOL FOR COLLECTING AND MANAGING DATA DURING MANUAL HARVESTING OF FRUITS AND VEGETABLES

TECHNICAL FIELD

The technology relates to utilizing a plurality of sensors for the collecting and managing data, and more specifically, to utilizing a plurality of sensors for collecting and managing data during manual harvesting of fruits and vegetables.

BACKGROUND

There is large number of crops that are harvested manually even today. But, the geo-referencing information of manually picked fruits and vegetables is not recorded during the harvesting operation.

On the other hand, there is a great value in recording the position of the products being harvested along with, or without, other product characteristics such as size, maturity, diseases and so on. These data need to be obtained without requiring the direct logging/recording action of the picker. There is no currently available solution for recording this information without disturbing the picking operation.

Therefore there is a need for a device that can collect position and/or product characteristics information during manual harvesting of fruits and vegetables without disturbing the picker's activities.

SUMMARY

This Summary is provided to introduce a selection of concepts that are further described below in the Detailed Description. This Summary is not intended to identify key or essential features of the claimed subject matter, nor is it intended to be used as an aid in determining the scope of the claimed subject matter.

An apparatus for collecting and managing data during an agricultural manual operation is provided. The agricultural manual operation includes harvesting, planting roots, cutting flowers, and thinning a field of a particular crop. The apparatus comprises: an intelligent tool configured to log an event including an agricultural manual operation when a picker succeeds in picking at least one harvested product by using the intelligent tool, or planting event when a worker succeeds in planting at least one product, or cutting flowers event when a worker succeeds in cutting at least one flower product, or thinning event when a worker succeeds in thinning a field of a particular crop. The apparatus further comprises a means for collecting a set of data relevant to at least one manually picking event, or manually planting event, or manually cutting event, or manually thinning event.

DESCRIPTION OF THE DRAWINGS

The accompanying drawings, which are incorporated in and form a part of this specification, illustrate embodiments of the technology and, together with the description, serve to explain the principles below.

DETAILED DESCRIPTION

Reference now is made in detail to the embodiments of the technology, examples of which are illustrated in the accompanying drawings. While the present technology will be described in conjunction with the various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific-details are set forth in order to provide a thorough understanding of the presented embodiments. However, it will be obvious to one of ordinary skill in the art that the presented embodiments may be practiced without these specific details. In other instances, well known methods, procedures, components, and circuits have not been described in detail as not to unnecessarily obscure aspects of the presented embodiments.

Figure 1:
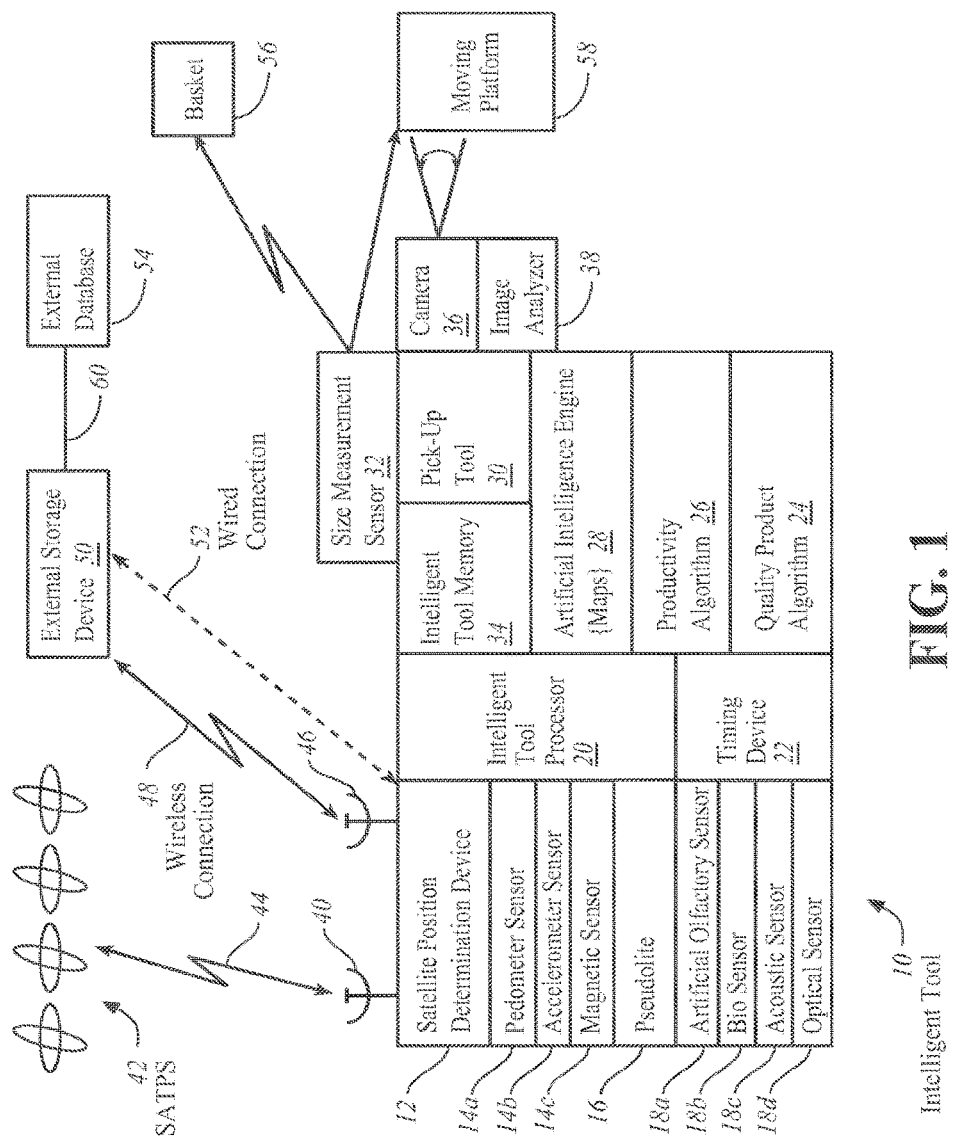
FIG. 1 illustrates an intelligent tool configured to collect a set of data relevant to a manually harvested product without disrupting the manual picking operation for the purposes of the present technology.

In an embodiment of the present technology, FIG. 1 depicts an intelligent tool 10 configured to collect a set of data relevant to an agricultural manual operation (by a laborer using a special tool 30) without disrupting or delaying the agricultural manual operation itself.

In an embodiment of the present technology, the agricultural manual operation includes harvesting, planting roots, cutting flowers, and pruning and thinning with pruners and hoes.

In an embodiment of the present technology, the apparatus comprises: an intelligent tool (10 of FIG. 1) configured to log an event including an agricultural manual operation when a picker succeeds in picking at least one harvested product by using the intelligent tool, or planting event when a worker succeeds in planting at least one product, or cutting flowers event when a worker succeeds in cutting at least one flower product, or pruning and thinning event using pruners and hoes when a worker succeeds in pruning and thinning fruit trees.

Pruning invigorates and results in strong growth close to the pruning cut. Pruning reduces the number of shoots so remaining shoots are stimulated. However, total shoot growth and size of the limb is reduced. Two types of pruning cuts include heading back and thinning out.

Heading is cutting off part of a shoot or branch apical dominance and removes stimulates branching and stiffens the limb.

Thinning cuts remove the entire shoot or branch at its junction with a lateral, scaffold, or trunk. Thinning cuts are less invigorating, improve light penetration, and can redirect the limb. Indeed, limb position affects vigor and fruitfulness. Vertical or upright branches, typical in the tops of trees, produce the longest shoots near the end of the limb and tend to be excessively vigorous and not very fruitful. Fruit are often of poor quality and subject to limb rub. Limbs growing slightly above horizontal are more apt to develop a uniform distribution of vigor and fruitfulness. Light distribution tends to be even, and because fruit hang along the branch, they are less prone to limb rub. Limbs growing below horizontal tend to develop suckers along the upper surface. Excess sucker growth will result in shading. Hangers, or limbs developing on the underside of branches or scaffolds, are heavily shaded and low in vigor. Fruit developing on such wood is of poor size and color.

In an embodiment of the present technology, the apparatus further comprises a means for collecting a set of data relevant to at least one manually picking event, or manually planting event, or manually cutting event, or manually thinning event.

In an embodiment of the present technology, manually harvested products are selected from the group consisting of: fruits; vegetables; roots; flowers; and berries. There are many different types of harvesting tools available, both hand and power operated.

In an embodiment of the present technology, the pick-up tool 30 is selected from the group consisting of: a hoe; a knife; a long-handled tool; a short-handheld tool; a clipper; a shear; a powered handheld shaker; a powered handheld combing device; a snapping and/or stripping, glove or tool; and a fork.

Long-handled tools usually offer greater leverage and reach, and often allow working from a standing position. The handle may be either straight or have a D-shaped hand grip on the end. With some tools, such as long-handled pruners, handle extensions may be available.

Short-handled tools are lighter in weight, usually less expensive, more compact to store than the long-handled varieties, and allow one to work efficiently in confined spaces or while kneeling. Common short-handled tools include hand pruners and clippers, hoes, garden trowels, and cultivators.

In an embodiment of the present technology, referring still to FIG. 1, the harvested product can be placed into basket 56, can be stripped into bucket (not shown); can be picked and delivered to a picking moving platform 58 by using a vacuum-operated mechanical picker (not shown) including a picking tube.

In an embodiment of the present technology, the choice of pick up tool 30 depends on the precise nature of a harvested product.

Example I

Avocados, citrus and other fruits can be "snapped". This means a glove with sensors, and not necessarily having any clippers or blades, can be used.

Example II

Table olives are "stripped" to a bucket.

Example III

Fruits (like apples) are snapped by using snapping instrumented gloves.

In an embodiment of the present technology, the intelligent tool 10 of FIG. 1 includes a device 36 configured to analyze and detect the hands movements of the laborer. The device 36 can include a camera developed for video games, or another hand movement ranging device such as a sensor in a magnetic field, or a lidar/ladar sensor. This information is useful to analyze and compare the productivity of different laborers employed to pick up the harvest.

In an embodiment of the present technology, the intelligent tool 10 of FIG. 1 includes a pressure sensor (not shown) with a 10 cm resolution (sold for a $1 in large volumes) that is configured to determine the true height position of the harvest fruit. For example, whether the harvested fruit is close to ground or is located at the tree level, etc.

In an embodiment of the present technology, the pressure sensor could help avoiding false positives data, that is only the data relevant to the fruits actually harvested and delivered to the basket 56 is collected for further data analysis.

In an embodiment of the present technology, the pressure sensor could also record the number of false positive data for each laborer for further analysis of each laborer productivity.

In an embodiment of the present technology, the intelligent tool 10 of FIG. 1 includes a size and shape sensor to measure the size of fruits and vegetables. The size sensor (as well as the shape sensor) can be implemented by using a machine vision, a laser scanner, etc.

In an embodiment of the present technology, as shown in FIG. 1, the intelligent tool 10 includes an internal memory 34 and a wired 52 or wireless 48 connection to an external data storage device 50 through its access to a wireless network connected to the relevant external database 54.

In an embodiment of the present technology, the wireless network (48 of FIG. 1) is selected from the group consisting of: a wireless personal area network (WPAN); a wireless optical communication network; a wireless Universal Serial Bus (USB) network; a Bluetooth network; a body area network (BAN); a wireless body area network (WBAN); a body sensor network (BSN); a Z-Wave network; a Wi-Fi network; a Zig-Bee network; and a cell phone network.

In an embodiment of the present technology, the wireless network is implemented by using a wireless personal area network (WPAN) comprising a personal area network (PAN) carried over infrared wireless network provided by an Infrared Data Association (IrDA).

The Infrared Data Association (IrDA) is an industry driven interest group that was founded in 1993 by around 50 companies. IrDA provides specifications for a complete set of protocols for wireless infrared communications and the name "IrDA" also refers to that set of protocols. The main reason for using IrDA had been wireless data transfer over the "last one meter" using point and shoot principles. Thus, it has been implemented in portable devices such as mobile phones, laptops, cameras, printers, medical devices and many more. Main characteristics of this kind of wireless optical communications is a physically secure data transfer, Line-of-Sight (LOS) and very low bit error rate (BER) that makes it very efficient.

In an embodiment of the present technology, the wireless network is implemented by using a Wireless Universal Serial Bus (WUSB) radio high-bandwidth wireless communication protocol. The Wireless USB is based on the WiMedia Alliance's ultra-wideband (UWB) common radio platform, which is capable of sending 480 Mbit/s at distances up to 3 meters (9.8 ft.) and 110 Mbit/s at up to 10 meters (33 ft.). It was designed to operate in the 3.1 to 10.6 GHz frequency range, although local regulatory policies may restrict the legal operating range for any given country.

In an embodiment of the present technology, the wireless network is implemented by using Bluetooth. Bluetooth is a wireless technology standard for exchanging data over short distances (using short-wavelength radio transmissions in the ISM band from 2400-2480 MHz) from fixed and mobile devices, creating personal area networks (PANs) with high levels of security. Created by telecom vendor Ericsson in 1994, it was originally conceived as a wireless alternative to RS-232 data cables. It can connect several devices, overcoming problems of synchronization.

Bluetooth is managed by the Bluetooth Special Interest Group, which has more than 18,000 member companies in the areas of telecommunication, computing, networking, and consumer electronics. Bluetooth was standardized as Institute of Electrical and Electronics Engineers (IEEE) 802.15.1, but the standard is no longer maintained. The Bluetooth Special Interest Group oversees the development of the specification, manages the qualification program, and protects the trademarks. To be marketed as a Bluetooth device, it must be qualified to standards defined by the Bluetooth Special Interest Group and must license a number of patents from the Bluetooth Special Interest Group in order to legally practice the Bluetooth technology.

In an embodiment of the present technology, the wireless network is implemented by using a Z-Wave wireless communications protocol designed for home automation, specifically to remotely control applications in residential and light commercial environments. The technology uses a low-power RF radio embedded or retrofitted into home electronic devices and systems, such as lighting, residential access control, entertainment systems and household appliances.

In an embodiment of the present technology, the wireless network is implemented by using ZigBee network that employs a number of high level communication protocols to create personal area networks built from small, low-power digital radios. ZigBee is based on an IEEE 802.15 standard. The low-powered ZigBee devices are configured to transmit data over longer distances by creating a mesh network comprising a number of intermediate devices in order to reach more distant devices.

Thus, ZigBee network is a wireless ad hoc network. A wireless ad hoc network is a decentralized type of wireless network. The network is ad hoc because it does not rely on a pre-existing infrastructure, such as routers in wired networks or access points in managed (infrastructure) wireless networks. Instead, each node participates in routing by forwarding data for other nodes, so the determination of which nodes forward data is made dynamically on the basis of network connectivity. In addition to the classic routing, ad hoc networks can use flooding for forwarding data.

In an embodiment of the present technology, the wireless network is implemented by using a body area network (BAN).

A body area network (BAN), also referred to as a wireless body area network (WBAN) or a body sensor network (BSN), is a wireless network of wearable computing devices. In particular, the network consists of several miniaturized body sensor units (BSUs) together with a single body central unit (BCU). The development of WBAN technology started around 1995 around the idea of using wireless personal area network (WPAN) technologies to implement communications on, near, and around the human body. About six years later, the term "BAN" came to refer to systems where communication is entirely within, on, and in the immediate proximity of a human body. A WBAN system can use WPAN wireless technologies as gateways to reach longer ranges. The reach of a WPAN varies from a few centimeters to a few meters.

In an embodiment of the present technology, the wireless network is implemented by using a wireless Universal Serial Bus (USB) network.

In computer architecture, a bus (from the Latin omnibus, meaning 'for all') is a communication system that transfers data between components inside a computer, or between computers. This expression covers all related hardware components (wire, optical fiber, etc.) and software, including communication protocol.

The IEEE 1394 interface is a serial bus interface standard for high-speed communications and isochronous real-time data transfer. It was developed in the late 1980's and early 1990's by Apple, who called it FireWire. The 1394 interface is comparable to USB, though USB has more market share. Apple first included FireWire in some of its 1999 models, and most Apple computers since the year 2000 have included FireWire ports, though, as of 2013, nothing beyond the 800 version (IEEE-1394b). The interface is also known by the brand i.LINK (Sony), and Lynx (Texas Instruments). IEEE 1394 replaced parallel SCSI in many applications, because of lower implementation costs and a simplified, more adaptable cabling system. The 1394 standard also defines a backplane interface, though this is not as widely used. IEEE 1394 is the High-Definition Audio-Video Network Alliance (HANA) standard connection interface for A/V (audio/visual) component communication and control FireWire is also available in wireless, fiber optic, and coaxial versions using the isochronous protocols.

In an embodiment of the present technology, the wireless network is implemented by using the Wi-Fi network.

The Wi-Fi Alliance defines Wi-Fi as any "wireless local area network (WLAN) products that are based on the Institute of Electrical and Electronics Engineers' (IEEE) 802.11 standards". However, since most modern WLANs are based on these standards, the term "Wi-Fi" is used in general English as a synonym for "WLAN". Only Wi-Fi products that complete Wi-Fi Alliance interoperability certification testing successfully may use the "Wi-Fi CERTIFIED" trademark.

Many devices can use Wi-Fi, e.g. personal computers, video-game consoles, smartphones, some digital cameras, tablet computers and digital audio players. These can connect to a network resource such as the Internet via a wireless network access point. Such an access point (or hotspot) has a range of about 20 meters (65 feet) indoors and a greater range outdoors. Hotspot coverage can comprise an area as small as a single room with walls that block radio waves, or as large as many square miles achieved by using multiple overlapping access points.

In an embodiment of the present technology, referring still to FIG. 1, the intelligent tool 10 further includes a position determination device selected from the group consisting of: a GNSS sensor; a local navigation system; a pseudolite navigation system; an inverse GPS positioning system; a dead reckoning system; an acceleration sensor; a magnetic sensor; a pedometer; and a camera including an image analyzer configured to detect and analyze the hands movements of the manual laborer.

In an embodiment of the present technology, referring still to FIG. 1, the position determination device is configured to determine position coordinates of at least one harvested product. The data collected by the intelligent tool 10 during the harvesting operation and relevant to at least one agricultural manual operation includes the position coordinates of at least one harvested product.

In an embodiment of the present technology, referring still to FIG. 1, the position determination device comprises a satellite position determination device 12.

In an embodiment of the present technology, referring still to FIG. 1, the satellite position determination device 12 further comprises a Global Navigation Satellite System (GNSS) sensor.

Satellite positioning system (SATPS) 42 is a system of satellites that provide autonomous geo-spatial positioning with global coverage. It allows small electronic receivers to determine their location (longitude, latitude, and altitude) to high precision (within a few meters) using time signals transmitted along a line-of-sight by radio from satellites. The signals also allow the electronic receivers to calculate the current local time to high precision, which allows time synchronization. A satellite navigation system with global coverage may be termed a global navigation satellite system or GNSS.

As of April 2013, only the United States NAVSTAR Global Positioning System (GPS) and the Russian GLONASS are global operational GNSSs. China is in the process of expanding its regional BeiDou navigation system into the global Compass navigation system by 2020. The European Union's Galileo positioning system is a GNSS in initial deployment phase, scheduled to be fully operational by 2020 at the earliest. France, India and Japan are in the process of developing regional navigation systems.

Global coverage for each system is generally achieved by a satellite constellation of 20-30 medium Earth orbit (MEO) satellites spread between several orbital planes. The actual systems vary, but use orbital inclinations of >50° and orbital periods of roughly twelve hours (at an altitude of about 20,000 kilometers (12,000 mi).

The global navigation satellite system (GNSS) positioning for receiver's position is derived through the calculation steps, or algorithm, given below. In essence, GNSS receiver measures the transmitting time of GNSS signals emitted from four or more GNSS satellites and these measurements are used to obtain its position (i.e., spatial coordinates) and reception time.

Example IV

Spectrum technologies has a field scout device with GPS capabilities http://www.specmeters.com/store/cm1000/?F_Sort=2#description.

In an embodiment of the present technology, referring still to FIG. 1, the position determination device comprises a pseudolite navigation system 16.

Pseudolite is a contraction of the term "pseudo-satellite," used to refer to something that is not a satellite which performs a function commonly in the domain of satellites. Pseudolites are most often small transceivers that are used to create a local, ground-based GPS alternative. The range of each transceiver's signal is dependent on the power available to the unit. Being able to deploy one's own positioning system, independent of the GPS, can be useful in situations where the normal GPS signals are blocked/jammed (military conflicts).

In an embodiment of the present technology, referring still to FIG. 1, the position determination device comprises an "inverse GPS" positioning system where at least 3 towers with receivers are sited around the field, and these three towers each receive the transmission from the "tool" and compute the position using an inverse GPS positioning algorithm of the "Tool" in the field. The "inverse GPS" positioning system measures the Time of Arrival of the transmitted signal. The transponder receiver will use GPS and be in communication with the other towers to compute the position of the tool. This is the inverse to the pseudolite system, and can substitute for a pseudolite system.

In an embodiment of the present technology, referring still to FIG. 1, the position determination device comprises a dead reckoning system (not shown).

In navigation, dead reckoning (also ded (for deduced) reckoning or DR) is the process of calculating one's current position by using a previously determined position, or fix, and advancing that position based upon known or estimated speeds over elapsed time, and course. Dead reckoning is subject to cumulative errors. The inertial navigation systems, which provide very accurate directional information, use dead reckoning and are very widely applied.

In an embodiment of the present technology, referring still to FIG. 1, the dead reckoning system (like an inertial, gyroscope, pedometer, etc.) mounted on a manual laborer is reset or recalibrated by an object positioned at a known location like a basket, or by a moving platform.

An inertial navigation system (INS) is a navigation aid that uses a computer, motion sensors (accelerometers, see discussion below) and rotation sensors (gyroscopes, see discussion below) to continuously calculate via dead reckoning the position, orientation, and velocity (direction and speed of movement) of a moving object.

In an embodiment of the present technology, referring still to FIG. 1, the position determination device comprises a gyroscope (not shown).

A gyroscope is used in an inertial navigation system (INS). The gyroscope is a device for measuring or maintaining orientation, based on the principles of angular momentum. Mechanically, a gyroscope is a spinning wheel or disc in which the axle is free to assume any orientation. Although this orientation does not remain fixed, it changes in response to an external torque much less and in a different direction than it would without the large angular momentum associated with the disc's high rate of spin and moment of inertia. The device's orientation remains nearly fixed, regardless of the mounting platform's motion, because mounting the device in a gimbal minimizes external torque.

Gyroscopes based on other operating principles also exist, such as the electronic, microchip-packaged MEMS gyroscope devices found in consumer electronic devices, solid-state ring lasers, fiber optic gyroscopes, and the extremely sensitive quantum gyroscope.

In an embodiment of the present technology, referring still to FIG. 1, the position determination device comprises an accelerometer sensor (14b).

An accelerometer is used in an inertial navigation system (INS). An accelerometer is a device that measures proper acceleration. Micro machined accelerometers are increasingly present in portable electronic devices and video game controllers, to detect the position of the device or provide for game input. Accelerometers are also used to detect and monitor vibration in rotating machinery. Accelerometers are used in tablet computers and digital cameras so that images on screens are always displayed upright.

In an embodiment of the present technology, referring still to FIG. 1, the position determination device comprises a magnetic sensor (14c).

Magnetometers can be divided into two basic types: scalar magnetometers configured to measure the total strength of the magnetic field to which they are subjected, but not its direction; and vector magnetometers configured to measure the component of the magnetic field in a particular direction, relative to the spatial orientation of the device.

In an embodiment of the present technology, referring still to FIG. 1, the position determination device comprises a pedometer (14a).

A pedometer is a device, usually portable, electronic/electromechanical, that counts each step a person takes by detecting the motion of the person's hips. Because the distance of each person's step varies, an informal calibration, performed by the user, is required if presentation of the distance covered in a unit of length (such as in kilometers or miles) is desired, though there are now pedometers that use electronics and software to automatically determine how a person's step varies.

In an embodiment of the present technology, referring still to FIG. 1, the position determination device comprises a permanently installed device (not shown) such as a marker, a beacon, a bar code, or a RFID tag.

In an embodiment of the present technology, referring still to FIG. 1, the intelligent tool 10 includes a camera 36 including an image analyzer 38 configured to detect and analyze the hands movements of the manual laborer. This information can be used to determine the productivity of a manual laborer. Please, see discussion below.

In an embodiment of the present technology, referring still to FIG. 1, the intelligent tool 10 further includes a crop quality sensor configured to determine a ripeness value of at least harvested product.

In an embodiment of the present technology, referring still to FIG. 1, the intelligent tool 10 further includes a crop quality sensor further comprising an artificial olfactory sensor (18a) configured to detect an odor of a harvested product.

In an embodiment of the present technology, referring still to FIG. 1, the artificial olfactory sensor (18a) further comprises an electronic nose configured to detect odors or flavors.

Over the last decade, "electronic sensing" or "e-sensing" technologies have undergone important developments from a technical and commercial point of view. The expression "electronic sensing" refers to the capability of reproducing human senses using sensor arrays and pattern recognition systems.

Starting in 1982, research has been conducted to develop technologies, commonly referred to as electronic noses, capable of detecting and recognizing odors and flavors. The stages of the recognition process are similar to human olfaction and are performed for identification, comparison, quantification and other applications, including data storage and retrieval. However, hedonic evaluation is a specificity of the human nose given that it is related to subjective opinions. These devices have undergone much development and are now used to fulfill industrial needs.

In an embodiment of the present technology, referring still to FIG. 1, the intelligent tool 10 further includes a crop quality sensor further comprising an acoustic sensor (18c).

Surface acoustic wave sensors are a class of micro electromechanical systems (MEMS) which rely on the modulation of surface acoustic waves to sense a physical phenomenon. The sensor transduces an input electrical signal into a mechanical wave which, unlike an electrical signal, can be easily influenced by physical phenomena. The device then transduces this wave back into an electrical signal. Changes in amplitude, phase, frequency, or time-delay between the input and output electrical signals can be used to measure the presence of the desired phenomenon.

The surface acoustic wave sensor can detect the temperature, and mass of the harvested product. Thus, the crop quality of the harvested product can be determined because the rotten fruits or vegetables have higher temperature and higher mass as compared to the ripe fruits and vegetables.

In an embodiment of the present technology, referring still to FIG. 1, the intelligent tool 10 further includes a crop quality sensor further comprising a bio sensor (18b).

In an embodiment of the present technology, referring still to FIG. 1, the bio sensor (18b) further comprises a chemical vapor sensor.

Chemical vapor sensors use the application of a thin film polymer across the delay line which selectively absorbs the gas or gases of interest. An array of such sensors with different polymeric coatings can be used to sense a large range of gases on a single sensor with resolution down to parts per trillion, allowing for the creation of a sensitive "lab on a chip." This kind of sensor can be used to detect the chemical vapors that the harvested crop produces. By creating the database of the chemical vapors produced by each harvested crop one can detect the presence of additional gases that can be indicative of the harvested product disease.

In an embodiment of the present technology, referring still to FIG. 1, the bio sensor (18b) further comprises a biologically-active layer placed between the inter digitized electrodes which contains immobilized antibodies. If the corresponding antigen is present in a sample, the antigen will bind to the antibodies, causing a mass-loading on the device. These sensors can be used to detect bacteria and viruses in samples, to detect microbial pathogens in fruit irrigation, to detect microbial pathogens in vegetable irrigation; as well as to quantify the presence of certain mRNA and proteins.

In an embodiment of the present technology, referring still to FIG. 1, the intelligent tool 10 further includes a crop quality sensor (18d) including a sensor configured to detect optical radiation (an optical sensor), or infrared (IR) radiation (an IR sensor), or ultraviolet (UV) radiation (a UV sensor), or a combinational sensor configured to detect multiple modes of radiation.

In an embodiment of the present technology, an optical sensor includes an image sensor. The image sensor is a device that converts an optical image into an electronic signal. It is used mostly in digital cameras, camera modules and other imaging devices. Early analog sensors were video camera tubes; currently used types are semiconductor charge-coupled devices (CCD) or active pixel sensors in complementary metal-oxide-semiconductor (CMOS) or N-type metal-oxide-semiconductor (NMOS, Live MOS) technologies.

A multispectral image is one that captures image data at specific frequencies across the electromagnetic spectrum. The wavelengths may be separated by filters or by the use of instruments that are sensitive to particular wavelengths, including light from frequencies beyond the visible light range, such as infrared. Spectral imaging can allow extraction of additional information the human eye fails to capture with its receptors for red, green and blue. It was originally developed for space-based imaging.

Multispectral images are the main type of images acquired by remote sensing (RS) radiometers. Dividing the spectrum into many bands, multispectral is the opposite of panchromatic, which records only the total intensity of radiation falling on each pixel. Usually, satellites have three or more radiometers (Landsat has seven). Each one acquires one digital image (in remote sensing, called a 'scene') in a small band of visible spectra, ranging from 0.7 µm to 0.4 µm, called red-green-blue (RGB) region, and going to infrared wavelengths of 0.7 µm to 10 or more µm, classified as near infrared (NIR), middle infrared (MIR) and far infrared (FIR or thermal). In the Landsat case, the seven scenes comprise a seven-band multispectral image. Spectral imaging with more numerous bands, finer spectral resolution or wider spectral coverage may be called hyperspectral or ultraspectral.

The availability of wavelengths for remote sensing and imaging is limited by the infrared window and the optical window.

Full-spectrum photography is a subset of multispectral imaging. In practice, a specialized broadband/full-spectrum film camera captures visible and near infrared light, commonly referred to as the "VNIR".

Modified digital cameras can detect some ultraviolet, all of the visible and much of the near infrared spectrum, as most digital imaging sensors have sensitivity from about 350 nm to 1000 nm. An off-the-shelf digital camera contains an infrared hot mirror filter that blocks most of the infrared and a bit of the ultraviolet that would otherwise be detected by the sensor, narrowing the accepted range from about 400 nm to 700 nm. Replacing a hot mirror or infrared blocking filter with an infrared pass or a wide spectrally transmitting filter allows the camera to detect the wider spectrum light at greater sensitivity. Without the hot-mirror, the red, green and blue (or cyan, yellow and magenta) elements of the color filter array placed over the sensor elements pass varying amounts of ultraviolet and infrared which may be recorded in any of the red, green or blue channels depending on the particular sensor in use and on the dyes used in the Bayer filter. A converted full-spectrum camera can be used for ultraviolet photography or infrared photography with the appropriate filters.

Ultraviolet photography is a photographic process of recording images by using light from the ultraviolet (UV) spectrum only.

In reflected UV photography the subject is illuminated directly by UV emitting lamps (radiation sources) or by strong sunlight. A UV transmitting filter is placed on the lens, which allows ultraviolet light to pass and which absorbs or blocks all visible and infrared light. UV filters are made from special colored glass and may be coated or sandwiched with other filter glass to aid in blocking unwanted wavelengths. Examples of UV transmission filters are the Baader-U filter and the Precision-U filter both of which exclude most visible and infrared light. Older filters include the Kodak Wratten 18A, B+W 403, Hoya U-340 and Kenko U-360 most of which need to be used in conjunction with an additional infrared blocking filter. Typically, such IR blocking, UV transmissive filters are made from Schott BG-38, BG-39 and BG-40 glass.

Most types of glass will allow longwave UV to pass, but absorb all the other UV wavelengths, usually from about 350 nm and below. For UV photography it is necessary to use specially developed lenses having elements made from fused quartz or quartz and fluorite. Lenses based purely on quartz show a distinct focus shift between visible and UV light, whereas the fluorite/quartz lenses can be fully corrected between visible and ultraviolet light without focus shift. Examples of the latter type are the Nikon UV-Nikkor 105 mm f/4.5, the Coastal Optics 60 mm f/4.0, the Hasselblad (Zeiss) UV-Sonnar 105 mm and the Asahi Pentax Ultra Achromatic Takumar 85 mm f/3.5. Suitable digital cameras for reflected UV photography have been reported to be the (unmodified) Nikon D70 or D40 DSLRs, but many others might be suitable after having their internal UV and IR blocking filter removed. The Fujifilm FinePix IS Pro digital SLR camera is purposely designed for ultraviolet (and infrared) photography, with a frequency response rated from 1000-380 nm, although it also responds to somewhat longer and shorter wavelengths. Silicon (from which DSLR sensors are made) can respond to wavelengths between 1100-190 nm.

Photography based on visible fluorescence induced by UV radiation uses the same ultraviolet illumination as in reflected UV photography. However, the glass barrier filter used on the lens must now absorb or block all ultraviolet and infrared light and must permit only the visible radiation to pass. Visible fluorescence is produced in a suitable subject when the shorter, higher energy ultraviolet wavelengths are absorbed, lose some energy and are emitted as longer, lower energy visible wavelengths.

Example V

Indeed, certain fruit defects invisible in optical spectrum can be easily detected in UV spectrum.

In an embodiment of the present technology, referring still to FIG. 1, the intelligent tool 10 further includes a surface acoustic wave device (not shown).

A surface acoustic wave device can be made sensitive to optical wavelengths through the phenomena known as acoustic charge transport (ACT), which involves the interaction between a surface acoustic wave and photo generated charge carriers from a photo conducting layer. Ultraviolet radiation sensors employ the use of a thin film layer of zinc oxide across the delay line. When exposed to ultraviolet radiation, zinc oxide generates charge carriers which interact with the electric fields produced in the piezoelectric substrate by the traveling surface acoustic wave. This interaction decreases the velocity and the amplitude of the signal.

Surface acoustic wave devices can be also used to measure changes in viscosity of a liquid placed upon it. As the liquid becomes more viscous the resonant frequency of the device will change in correspondence. A network analyzer is needed to view the resonant frequency.

A number of harvested vegetable product diseases can be detected by using a bio sensor disclosed above.

Example VI

Asparagus

The main diseases of asparagus are *Fusarium* stem and crown rot caused by *Fusarium moniliforme*, and (or) *F. oxysporum* f. sp. *asparagi*, *Fusarium* wilt and root rot caused by *F. oxysporum* f. sp. *asparagi*, and rust caused by *Puccinia asparagi*. One or both *Fusarium* spp. may be present as soil borne pathogens wherever asparagus is grown in the United States.

Example VII

Beets

Root rot is the most important disease of table beets (*Beta vulgaris* L.) in New York. The disease was first reported by Natti in 1953 as "Dry Rot of Table Beets." He stated that the disease does not occur every year, but sporadic outbreaks in some years can cause severe losses. In recent years, however, root rot has occurred more frequently and is becoming a limiting factor in table beet production. Root rot reduces both yield and quality of beets, causing serious processing problems and increased costs. Field observations have suggested that the initiation of root rot in table beets is associated closely with the cool, wet soil conditions that prevail in early to late spring in New York when considerable acreage of beets is often planted. Damage and losses due to this disease are expressed as reduced stands, abnormally shaped roots of undesirable size and roots with external or internal rot. Pathogenic fungi known to cause root rot of both table beet and sugar beet include *Pythium* spp., *Rhizoctonia solani*, *Aphanomyces cochlioides*, and *Phoma betae*. In New York, *Pythium ultimum* is the primary causal agent of this disease and causes severe economic losses during cool, wet soil conditions. Although *R. solani* is encountered less frequently, it is capable of causing seed and seedling diseases of table beets as well as infecting older plants later in the growing season during drier and warmer soil conditions.

Example VIII

The Sugar-Beet
The sugar-beet cyst nematode, *Heterodera schachtii*, was first discovered on red beets in Syracuse in 1961 and near Lyons, N.Y., in 1970. This nematode is now known to be distributed throughout the red beet- and cabbage-growing areas of New York. High populations have caused considerable economic losses on 2 farms, and very light infestations are known to occur on approximately 20 additional farms. The sugar-beet cyst nematode is a major limiting factor in the production of sugar beets in the United States and other countries of the world. Sugar-beet industries have been eliminated where control measures were not practiced. In commercial fields in New York, this nematode has damaged red beets and cabbage. Other hosts include broccoli, Brussels sprouts, cauliflower, rhubarb, spinach, and related weeds such as shepherdspurse, wild radish, mustard, and dock.

A number of fruit product diseases can be also detected by using bio sensors. Indeed, a responsive macromolecule changes its conformation and/or properties in a controllable, reproducible, and reversible manner in response to an external stimulus (solvent, pH, temperature, etc.). These changes can be used to create a large variety of smart devices. The good processability of most smart polymers facilitates their incorporation into devices and adds additional advantages (e.g. all plastic electronic/optical sensors).

Example IX

A biosensor using a flow injection was used to determine citrate in fruit juices by the Department of Food Science and Nutrition in Republic of Korea. A biosensor system was constructed for the determination of citrate concentration in foods. Citric acid exists in greater than trace amounts in a variety of fruits and vegetables, most notably citrus fruits. Lemons and limes have particularly high concentrations of the acid; it can constitute as much as 8% of the dry weight of these fruits (about 47 g/L in the juices). The concentrations of citric acid in citrus fruits range from 0.005 mol/L for oranges and grapefruits to 0.30 mol/L in lemons and limes. Within species, these values vary depending on the cultivar and the circumstances in which the fruit was grown. The citrate biosensor system consisted of a sample injector, peristaltic pump, enzyme reactor. Citrate lyase and oxaloacetate decarboxylase were immobilized for the enzyme reactor. The carbonate ions produced through the enzyme reactions of citrate were detected. The optimum conditions for the biosensor system were investigated.

Example X

Carbamate Pesticide Control
Carbamate pesticide is very dangerous as it affects the nervous system by disrupting an enzyme that regulates acetylcholine, a neurotransmitter. The enzyme effects are usually reversible. There are several subgroups within the carbamates. A biosensor based on acetylcholinesterase immobilized on a composite of polyaniline-carbon nanotubes was used for electrochemical detection of carbamate pesticide in fruit and vegetables in Instituto de Química de São Carlos, Universidade de Sao Paulo, Sao Carlos, Sao Paulo CEP 13566-590, Brazil. ivana@iqsc.usp.br In an embodiment of the present technology, referring still to FIG. 1, the intelligent tool 10 further includes a timing device 22, a processor 20, a memory 34, and a quality product algorithm 24.

In an embodiment of the present technology, referring still to FIG. 1, the quality product algorithm 24 comprises the following steps: (a) determining and recording a harvest duration timing that at least one laborer-picker took to pick at least one harvested product; (b) determining the productivity measure of each available laborer by comparing all recorded harvest duration timings for each available laborer; and (c) sending the determining productivity measure to a relevant external database 54 by using an antenna 46 and utilizing a wired 52 or wireless connection 48 and available wireless network, as fully described above.

In an embodiment of the present technology, referring still to FIG. 1, the intelligent tool 10 further includes a size measurement sensor 32 configured to measure the size of at least one harvested product. The size measurement sensor 32 can be implemented by using a laser sensor.

In an embodiment of the present technology, referring still to FIG. 1, the intelligent tool 10 further includes the quality algorithm 24. The size measurement data of the harvested products collected by the sensor 32 is inputted into the quality product algorithm 24 because the quality value of the harvested product is related to its size.

In an embodiment of the present technology, referring still to FIG. 1, the bio data related to the quality, ripeness value and potential diseases of the harvested products collected by the bio sensor (18b), by the artificial olfactory sensor (18a), by the acoustic sensor (18c) and by the optical sensor (18d) are also inputted into the quality product algorithm 24 together with the position coordinates data of the harvested products corresponding to the quality product data.

Example XI

Quality Product Algorithm
For the harvested products located in the first tested area $(x_1 + \Delta x_1; y_1 + \Delta y_1; z_1 + \Delta z_1)$, whereas the values $x_1$, $y_1$, and $z_1$, and $\theta x_1$, $\Delta y_1$, and $\Delta z_1$ are predetermined, and located by one of the position determination sensors 12, (14a), (14b), (14c), or 16, the artificial olfactory sensor (18a), the bio sensor (18b), the acoustic sensor (18c) and the optical sensor (18d) are employed to determine the degree of ripeness and to establish the lack or presence of number of predetermined and likely diseases for the particular harvest product in the first tested area. If there are no predetermined and/or likely diseases for the particular harvested product are detected in the first tested area, the same procedure is repeated for the next tested area. If predetermined and/or likely diseases for the particular harvested product are detected in the first tested area, the first tested area is increased by using the same values $x_1$, $y_1$, and $z_1$, and by using the increased values of $\Delta_1 x_1$, $\Delta_1 y_1$, and $\Delta_1 z_1$ to determine the borders of the disease area and in order to quarantine this area.

In an embodiment of the present technology, referring still to FIG. 1, the intelligent tool 10 further includes an artificial intelligence engine 28.

In an embodiment of the present technology, referring still to FIG. 1, the artificial intelligence engine 28 can be implemented by using a processor, a memory, and at least one software tool configured to determine a set of metrics data relevant to a particular harvested field.

In an embodiment of the present technology, a set of metrics data relevant to a particular harvested field is selected from the group consisting of: a map of geographic area of mostly diseased harvested products; a map of a geographic area of harvested products having the most relative ripeness; a map of a geographic area of harvested products having the least relative ripeness; a map of a geographic area of harvested products having the most relative size; a map of a geographic area of harvested products having the least relative size; and a map of shape or color characteristics (for example, cucumbers straightness or apple redness).

In an embodiment of the present technology, the relative ripeness is given in a predetermined ripeness range. The relative size of a harvested product is also given in a predetermined size range.

In an embodiment of the present technology, the phytogeomorphology precision farming artificial intelligence agent can be used to determine a set of metrics data relevant to a particular harvested field.

Phytogeomorphology is the study of how terrain features affect plant growth. It was the subject of a treatise by Howard and Mitchell in 1985, who were considering the growth and varietal temporal and spatial variability found in forests, but recognized that their work also had application to farming, and the relatively new science (at that time) of precision agriculture. The premise of Howard and Mitchell is that features of the land's 3-D topography significantly affect how and where plants grow.

While phytogeomorphology is a broad term that applies to the relationship between plants and terrain attributes in general, it is also very applicable to the aspect of precision agriculture that studies crop growth temporal and spatial variability within farm fields. There is already a volume of work, although they don't use the term phytogeomorphology specifically, that considers farm field terrain attributes as affecting crop yield and growth.

The new science of Sustainable Intensification of Agriculture which is addressing the need for higher yields from existing fields can be fulfilled by some of the practical applications of phytogeomorphology applied to precision agriculture. The Sustainable Intensification of Agriculture uses the software tool LandMapR. An early version of the LandMapR software is available through the Opengeomorphometry project hosted under the Google Code project.

Example XII

Quality Product Maps

The Artificial Intelligence Engine 28 implemented by using the software tool LandMapR is configured to analyze the data collected by the quality product algorithm and is configured to create the relevant maps of ripe harvested products, including the degree of ripeness, and the relevant map of the diseased harvested products. Those maps are sent to the external database 54 by using the antenna 46 and available wireless network.

Figure 2:
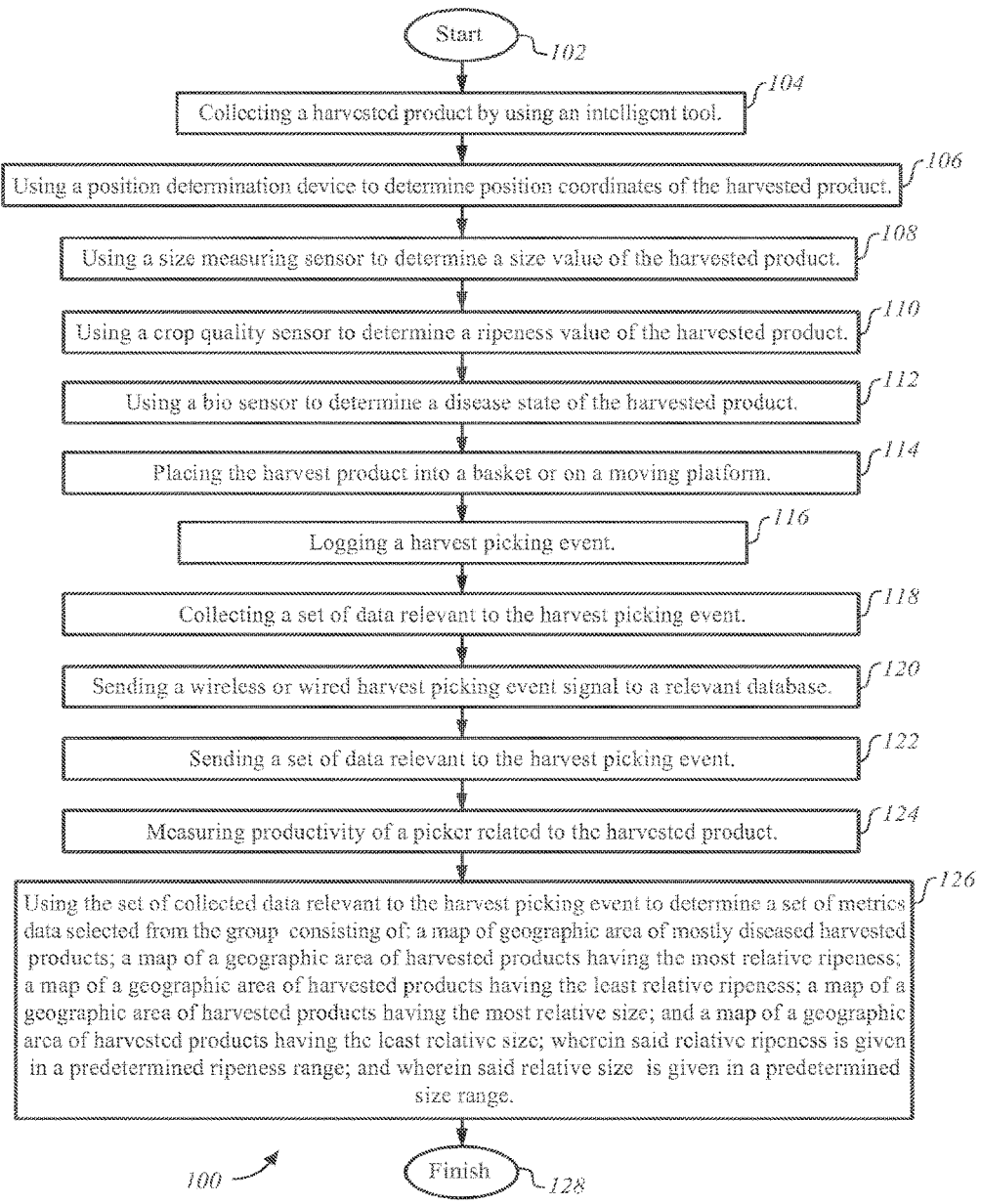
FIG. 2 is a flow chart of a method for collecting a set of data relevant to a manually harvested product without disrupting the manual picking operation by using the intelligent tool of FIG. 1 for the purposes of the present technology.

In an embodiment of the present technology, FIG. 2 depicts a flow chart 100 of a method for collecting a set of data relevant to a manually harvested product without disrupting the manual picking operation by using the intelligent tool 10 of FIG. 1

In an embodiment of the present technology, the block 104 of the flow chart 100 depicts the step of collecting a harvested product by using the intelligent tool 10 of FIG. 1, and more specifically, by using a pick-up tool 30 of FIG. 1.

In an embodiment of the present technology, the pick-up tool 30 of FIG. 1 comprises (depending on the nature of the harvested product, please, see the discussion above): a clipper; a shear; a powered handheld shaker; a powered handheld combing device; a snapping and/or stripping, glove or tool; or a fork.

In an embodiment of the present technology, the block 106 of the flow chart 100 of FIG. 2 shows the step of using a position determination device to determine position coordinates of at least one harvested product. The position determination device of FIG. 1 can comprise: a satellite position determination device 12, a pseudolite 16, an acceleration sensor 14*b*, a magnetic sensor 14*c*, a pedometer 14*a*, or a camera 36 including an image analyzer 38 configured to detect and analyze the manual laborer hands movements.

In an embodiment of the present technology, the block 108 of the flow chart 100 of FIG. 2 depicts the step of using the size measuring sensor (32 of FIG. 1) configured to determine a size value of the harvested product. The size measuring sensor can be implemented by using a laser measurement tool.

In an embodiment of the present technology, the block 110 of the flow chart 100 of FIG. 2 shows the step of using the crop quality sensor (comprising the ripeness sensor and the quality product algorithm 24 of FIG. 1) to determine a ripeness value of at least one harvested product. The ripeness sensor of FIG. 1 is selected from the group consisting of: an optical sensor 18*d*, an artificial olfactory sensor 18*a*, an acoustic sensor 18*c*, and a bio sensor 18*b*.

In an embodiment of the present technology, the block 112 of the flow chart 100 of FIG. 2 depicts the step of using the bio sensor (18*b* of FIG. 1) To determine a disease state of the harvested product.

In an embodiment of the present technology, after the harvested product is inspected for ripeness and different diseases, and after its location is determined and recorded in the prior steps, the block 116 of the flow chart 100 of FIG. 2 depicts the step of logging an agricultural manual operation. The data relevant to the agricultural manual operation after the harvested product is inspected for ripeness and different diseases (degree of ripeness of the product, disease state of the harvested product, location of the picking event, etc.) is collected in the step 118.

In an embodiment of the present technology, the block 120 of the flow chart 100 of FIG. 2 depicts the step of sending a wireless agricultural manual operation signal to the external storage device 50 and further to the relevant database 54 by using the antenna 46 and wireless connection network 48, or by using the wired connection 52. The set of data relevant to the agricultural manual operation is sent to the external storage device 50 and further to the relevant database 54 by using the antenna 46 and wireless connection network 48, or by using the wired connection 52 in the step 122.

In an embodiment of the present technology, the wireless network 48 is selected from the group of available networks consisting of: a ZigBee network; a wireless personal area network (WPAN); a wireless optical communication network; a wireless Universal Serial Bus (USB) network; a Bluetooth network; a body area network (BAN); a wireless body area network (WBAN); a body sensor network (BSN); a Z-Wave network; a Wi-Fi network; and a cell phone network.

In an embodiment of the present technology, the block 124 of the flow chart 100 of FIG. 2 shows the step of measuring productivity of the manual laborer-picker related to the harvested product by determining and recording a time duration that picker took to pick the harvested product by using the camera 36 focused on the movement of hands of the picker, the image analyzer 38, the timing device 22 and the intelligent tool processor 20.

In an embodiment of the present technology, the block 126 of the flow chart 100 of FIG. 2 depicts the step of using the set of collected data relevant to at least one agricultural manual operation and by using the artificial intelligence engine 28 (of FIG. 1) to determine a set of metrics data relevant to a particular harvested field. The set of metrics is selected from the group consisting of: a map of geographic area of mostly diseased harvested products; a map of a geographic area of harvested products having the most relative ripeness; a map of a geographic area of harvested products having the least relative ripeness; a map of a geographic area of harvested products having the most relative size; and a map of a geographic area of harvested products having the least relative size. The relative ripeness is given in a predetermined ripeness range, and the relative size is given in a predetermined size range.

The above discussion has set forth the operation of various exemplary systems and devices, as well as various embodiments pertaining to exemplary methods of operating such systems and devices. In various embodiments, one or more steps of a method of implementation are carried out by a processor under the control of computer-readable and computer-executable instructions. Thus, in some embodiments, these methods are implemented via a computer.

In an embodiment, the computer-readable and computer-executable instructions may reside on computer useable/readable media.

Therefore, one or more operations of various embodiments may be controlled or implemented using computer-executable instructions, such as program modules, being executed by a computer. Generally, program modules include routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote computer-storage media including memory-storage devices.

Although specific steps of exemplary methods of implementation are disclosed herein, these steps are examples of steps that may be performed in accordance with various exemplary embodiments. That is, embodiments disclosed herein are well suited to performing various other steps or variations of the steps recited. Moreover, the steps disclosed herein may be performed in an order different than presented, and not all of the steps are necessarily performed in a particular embodiment.

Although various electronic and software based systems are discussed herein, these systems are merely examples of environments that might be utilized, and are not intended to suggest any limitation as to the scope of use or functionality of the present technology. Neither should such systems be interpreted as having any dependency or relation to any one or combination of components or functions illustrated in the disclosed examples.

Although the subject matter has been described in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method, comprising:
   harvesting a product using a pick-up tool of a harvesting tool, wherein the pick-up tool comprises one or more of a clipper, a shear, a powered handheld shaker, a powered handheld combing device, a snapping tool, a stripping tool, a snapping glove, a stripping glove, or a fork;
   determining position coordinates of the product using a position sensor of the harvesting tool;
   determining a size of the product using a size measuring sensor of the harvesting tool;
   determining a quality of the product using a quality sensor of the harvesting tool;
   logging an agricultural manual operation to a memory of the harvesting tool;
   collecting a set of data relevant to the agricultural manual operation including at least the position coordinates, the size of the product, and the quality of the product;
   sending, using a wired or wireless network connection, the set of data to a remote database;
   using the set of data to generate a map of a geographic area of harvested products, wherein the map includes information describing a particular size metric of harvested products and a quality metric of harvested products.

2. The method of claim 1, wherein the particular size metric of harvested products corresponds to a size range of harvested products.

3. The method of claim 1, wherein the product is selected from the group consisting of: a fruit; a vegetable; a flower, a root crop; and a berry.

4. The method of claim 1, further comprising:
   determining a timing of harvesting the product using a timing device of the harvesting tool;
   determining, using the timing of harvesting the product, a productivity measure of a laborer associated with harvesting the product, wherein the set of data includes the productivity measure.

5. The method of claim 1, wherein harvesting the product comprises one or more of: placing the product into a basket; stripping the product into a bucket; using a vacuum-operated mechanical picker including a picking tube to pick and deliver the product to a picking moving platform; and leaving the product on the ground for pickup by a laborer.

6. The method of claim 1, wherein the wired or wireless network connection corresponds to a wireless network connection selected from the group consisting of:
   a ZigBee network; a wireless personal area network (WPAN); a wireless optical communication network; a wireless Universal Serial Bus (USB) network; a Bluetooth network; a body area network (BAN); a wireless body area network (WBAN); a body sensor network (BSN); a Z-Wave network; a Wi-Fi network; and a cell phone network.

7. The method of claim 1, wherein the quality sensor corresponds to a ripeness sensor and wherein the quality metric corresponds to a ripeness metric.

8. The method of claim 1, wherein the position sensor is selected from the group consisting of:
   a GNSS sensor; a local navigation system; an inverse GPS positioning system; a pseudolite navigation system; a dead reckoning system; an acceleration sensor; a magnetic sensor; a pedometer; a RFID tag; and a camera including an image analyzer configured to detect and analyze hand movements.

9. The method of claim 1, further comprising:
   measuring a shape of the product using a shape measuring sensor of the harvesting tool, wherein the set of data includes the shape of the product, and wherein the map includes information describing a shape metric of harvested products.

10. The method of claim 9, wherein said ripeness the quality sensor is selected from the group consisting of:
an optical sensor; an infrared (IR) sensor; an Ultra Violet ultraviolet (UV) sensor; an artificial olfactory sensor; a bio sensor; and an acoustic sensor.

11. The method of claim 1, further comprising
measuring a disease state of the product using a bio sensor of the harvesting tool, wherein the set of data includes the disease state of the product, and wherein the map includes information describing a disease metric of harvested products.

12. The method of claim 1, wherein determining the quality of the product includes using the size of the product.

13. A harvesting tool for collecting and managing data during a manual harvesting operation comprising:
a pick-up tool, wherein the pick-up tool comprises one or more of a clipper, a shear, a powered handheld shaker, a powered handheld combing device, a snapping tool, a stripping tool, a snapping glove, a stripping glove, or a fork;
a position sensor for determining a position of a product harvested using the pick-up tool;
a size measuring sensor for determining a size of the product harvested using the pick-up tool;
a quality sensor for determining a quality of the product harvested using the pick-up tool; and
a wired or wireless network transceiver for sending a set of data relevant to an agricultural manual operation, wherein the set of data includes at least position coordinates of the product, the size of the product, and the quality of the product.

14. The harvesting tool of claim 13, further comprising:
an internal memory; and
a processor in data communication with the internal memory, the position sensor, the size measuring sensor, the quality sensor, and the wired or wireless network transceiver.

15. The harvesting tool of claim 13, wherein the position sensor is selected from the group consisting of: a GNSS sensor; a local navigation system; an inverse GPS positioning system; a pseudolite navigation system; a dead reckoning system; an acceleration sensor; a magnetic sensor; a pedometer; a camera including an image analyzer configured to detect and analyze hand movements; and a distance sensor configured to sense distance from beacons with RFID, bar code readers, and laser scanners.

16. The harvesting tool of claim 13, wherein the quality sensor corresponds to one or more of: an optical sensor; an artificial olfactory sensor; a bio sensor; and an acoustic sensor.

17. The harvesting tool of claim 13, wherein the quality sensor corresponds to a bio sensor is configured to determine a bio-parameter selected from the group consisting of:
carbamate pesticide in fruit and vegetables; citrate in fruits; glucose and sucrose in fruit juices; microbial pathogens in fruit irrigation, and microbial pathogens in vegetable irrigation.

18. The harvesting tool of claim 13, further comprising:
a timing device for determining a productivity measure of a picker using the harvesting tool.

19. The harvesting tool of claim 13, wherein the quality sensor corresponds to a ripeness sensor.

20. The harvesting tool of claim 13, further comprising a processor configured to determine a set of data relevant to a particular harvested field; and generate a map of the particular harvested field, wherein the map includes information describing a particular size metric of harvested products from the particular harvested field and a quality metric of harvested products from the particular harvested field.

* * * * *